Patented Apr. 5, 1949

2,466,245

UNITED STATES PATENT OFFICE 2,466,245

AZO-AZOXY DYES

Ernst Keller, Basel, Switzerland, assignor to J. R. Geigy A. G., Basel, Switzerland, a Swiss firm No Drawing. Application May 14, 1945, Serial No. 593,771
In Switzerland June 27, 1944

10 Claims. (Cl. 260—143)

I have found that valuable azo dyestuffs are obtained by condensing nitromonoazo dyestuffs of the general formula $$R-N=N-R_1-NO_2$$

wherein R means an aryl radical with an o-hydroxy carboxylic acid grouping and $R_1$ represents a p-phenylene radical, which may be further substituted, in an alkaline medium with aminodiphenylamine derivatives containing at least one water-solubilising group, such as a sulfonic acid or carboxyl group. The condensation can also be carried out under pressure. The interaction probably takes place in a manner similar to that resulting when condensing dinitrostilbene disulfonic acids or derivatives of nitroaminostilbene disulfonic acid with amines, that is to say by forming particularly azoxy azo dyestuffs.

The new dyestuffs which are obtainable according to the above method may be used for the dyeing of wool according to the after-chroming method or for the dyeing of leather. The same are especially suitable for chrome-printing onto cellulosic fibres. Thus especially reddish-brown to deep brown prints are obtained which are distinguished by good fastness properties to soaps, soap-soda and to light and which are particularly fast to chlorine. The dyestuffs are dark-brown powders which dissolve in water with an orange-brown to red-brown coloration.

The invention will be illustrated by the following examples, without being limited thereto; the parts are by weight.

Example 1

36.7 parts of 4-nitro-4'-hydroxy-1:1'-azobenzene-3'-carboxy-2-sulfonic acid and 26.4 parts of 4-aminodiphenylamine-2-sulfonic acid are heated for 12–16 hours to boiling under reflux with 600 parts of 8% caustic soda lye. Then further 600 parts of water are added and at 80°–90° C., small quantities of a difficultly soluble by-product thus produced are filtered off. Now, the alkalinity of the filtrate is decreased by means of hydrochloric acid until a slightly alkaline reaction has been reached, whereupon the condensation product is completely precipitated by means of sodium chloride and dried.

The dyestuff produces, on chrome-printing, full reddish-brown shades onto cellulosic fibres, the dyeings thus obtained being very fast to soap-soda, chlorine and to light.

A dyestuff having practically the same properties is obtained by condensing, instead of under reflux, for 6–8 hours in the pressure-vessel at 110°–115° C.

Example 2

35 parts of 4-nitro-4'-hydroxy-1:1'-azobenzene-3'-carboxy-2-sulfonic acid and 32.4 parts of 4-amino - 4' - hydroxydiphenylamine - 3' - carboxylic-acid-2-sulfonic acid are heated to boiling under reflux and for 12–16 hours in a stirred vessel with 600 parts of 4% caustic soda lye. After dilution with 800 parts of water the difficultly soluble by-product is filtered off and the dyestuff isolated as described in Example 1.

On chrome-printing onto cellulosic fibres deep reddish-brown shades of good fastness to boiling, to soap, soap-soda, to chlorine as well as to light are obtained.

Example 3

36.7 parts of 4-nitro-4'-hydroxy-1:1'-azobenzene-3'-carboxy-2-sulfonic acid and 40.4 parts of 4-amino - 4' - hydroxydiphenylamine - 3' - carboxy-2:5'-disulfonic acid are condensed at boiling temperature for 12–14 hours under reflux with 600 parts of 8% caustic soda lye. After separation of small quantities of a difficultly soluble by-product, the dyestuff is isolated.

The dyestuff yields, on chrome-printing onto cellulosic fibres, very full reddish-brown shades of good fastness properties in the moist state and of good fastness to chlorine and to light.

Another dyestuff having almost the same fastness properties is obtained by replacing the 4-nitro-4'-hydroxy - 1:1' - azobenzene - 3' - car - boxy-2-sulfonic acid by 4-nitro-2'-methyl-4'-hydroxy-1:1'-azobenzene - 3' - carboxy - 2 - sulfonic acid.

Example 4

31.7 parts of 4-nitro-2-methoxy-4'-hydroxy-1:1'-azobenzene-3'-carboxylic acid and 34.4 parts of 4-aminodiphenylamine-2:3'- disulfonic acid are boiled under reflux for 12–14 hours with 1000 parts of 5% caustic soda lye and, after having clarified the solution, worked up in the usual manner.

The new dyestuff yields, on chrome-printing onto cellulosic fibres, reddish-brown shades of good fastness properties in the moist state and of good light-fastness.

Example 5

28.7 parts of 4-nitro-4'-hydroxy-1:1'-azobenzene-3'-carboxylic acid and 26.4 parts of 4-aminodiphenylamine-2-sulfonic acid are condensed at boiling temperature for 12-14 hours under reflux with 600 parts of 8% caustic soda lye. After separation of the difficultly soluble by-product the new dyestuff is isolated in the usual manner.

The resulting dyestuff dyes chrome-leather in full, orange-brown shades; on chrome-printing, reddish-brown shades of good fastness properties in the moist state and of good light-fastness are produced onto cellulosic fibres.

The following table contains a certain number of further dyestuffs obtainable according to this invention:

| nitromonoazo dyestuff | diphenylamine derivative | shade of the condensation product obtained with the chrome-printing method |
|---|---|---|
| 4-nitro-4'-hydroxy-1:1'-azobenzene-3'-carboxylic acid-2-sulfonic acid. | 4-amino-4'-methoxydiphenylamine-2-sulfonic acid. | reddish-brown. |
| Do. | 4-amino-2':4'-dimethyldiphenylamine-2-sulfonic acid. | Do. |
| Do. | 4-aminodiphenylamine-3'-carboxylic acid-2-sulfonic acid. | Do. |
| 4-nitro-2'-methyl-4'-hydroxy-1:1'-azo-benzene-5'-carboxylic acid-2-sulfonic acid. | 4-amino-4'-hydroxydiphenylamine-3'-carboxylic acid-2:5'-disulfonic acid. | Do. |
| Do. | 4-amino-4'-hydroxydiphenylamine-3'-carboxylic acid-2-sulfonic acid. | Do. |
| 4-nitro-5-methyl-4'-hydroxy-2-methoxy-1:1'-azobenzene-3'-carboxylic acid. | 4-aminodiphenylamine-2-sulfonic acid. | brown. |
| Do. | 4-amino-4'-hydroxydiphenylamine-3'-carboxylic acid-2-sulfonic acid. | Do. |
| Do. | 4-amino-4'-hydroxydiphenylamine-3'-carboxylic acid-2:5'-disulfonic acid. | Do. |
| 4-nitro-2:5-dimethoxy-4'-hydroxy-1:1'-azobenzene-3'-carboxylic acid. | 4-aminodiphenylamine-2-sulfonic acid. | Do. |
| Do. | 4-aminodiphenylamine-2:3'-disulfonic acid. | Do. |
| Do. | 4-amino-4'-hydroxydiphenylamine-3'-carboxylic acid-2:5'-disulfonic acid. | Do. |

What I claim is:

1. A process for the manufacture of azo dyestuffs, comprising condensing in an alkaline medium a nitro-monoazo dyestuff of the general formula $$R-N=N-R_1-NO_2$$

wherein R means an aromatic radical of the benzene series containing a OH and a COOH group in o-position to one another and $R_1$ means a p-phenylene radical, with an aminodiphenylamine derivative of the general formula

wherein X means a member selected from the group consisting of H, OH, OCH$_3$, CH$_3$, COOH and SO$_3$H.

2. A process for the manufacture of azo dyestuffs, comprising condensing in an alkaline medium a nitro-monoazo dyestuff of the general formula

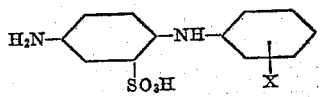

wherein $R_1$ means a p-phenylene radical, with an aminodiphenylamine derivative of the general formula

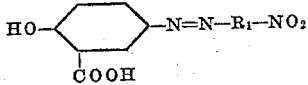

wherein X means a member selected from the group consisting of H, OH, OCH$_3$, CH$_3$, COOH and SO$_3$H.

3. A process for the manufacture of an azo dyestuff, comprising condensing in an alkaline medium 4-nitro-4'-hydroxy-1:1'-azobenzene-3'-carboxy-2-sulfonic acid with 4-aminodiphenylamine-2-sulfonic acid.

4. A process for the manufacture of an azo dyestuff, comprising condensing in an alkaline medium 4-nitro-4'-hydroxy-1:1'-azobenzene-3'-carboxy-2-sulfonic acid with 4-amino-4'-hydroxydiphenylamine-3'-carboxy-2-sulfonic acid.

5. A process for the manufacture of an azo dyestuff, comprising condensing in an alkaline medium 4-nitro-4'-hydroxy-1:1'-azobenzene-3'-carboxylic acid with 4-aminodiphenylamine-2-sulfonic acid.

6. The azo dyestuffs of the probable general formula

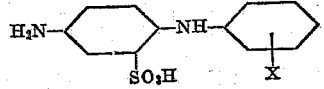

wherein R means an aromatic radical of the benzene series containing a OH and a COOH group in o-position to one another, $R_1$ means a p-phenylene radical and X means a member selected from the group consisting of H, OH, OCH$_3$, CH$_3$, COOH and SO$_3$H, being dark brown powders, dissolving in water with a brown to red-brown coloration and dyeing cellulosic fibres in the chrome-printing process red-brown to dark brown shades.

7. The azo dyestuffs of the probable general formula

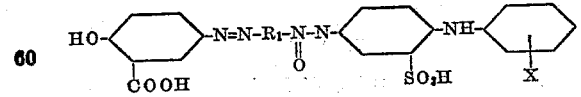

wherein $R_1$ means a p-phenylene radical and X means a member selected from the group consisting of H, OH, OCH$_3$, CH$_3$, COOH and SO$_3$H, being dark brown powders, dissolving in water with a brown to red-brown coloration and dyeing cellulosic fibres in the chrome-printing process red-brown to dark brown shades.

8. The azo dyestuff of the probable formula

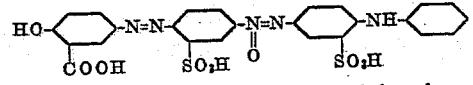

being a dark brown powder, dissolving in water with a brown-orange coloration and dyeing cellulosic fibres in the chrome-printing process reddish-brown shades.

9. The azo dyestuff of the probable formula

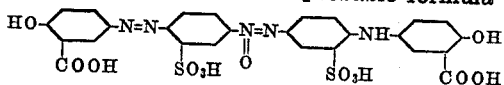

being a dark brown powder, dissolving in water with a brown-orange coloration and dyeing cellulosic fibres in the chrome-printing process reddish-brown shades.

10. The azo dyestuff of the probable formula

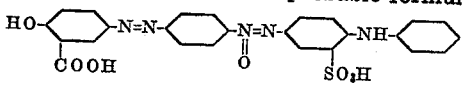

being a dark brown powder, dissolving in water with a brown-orange coloration and dyeing cellulosic fibres in the chrome-printing process reddish-brown shades.

ERNST KELLER.

REFERENCES CITED

The following references are of record in the file of this patent:

UNITED STATES PATENTS

| Number | Name | Date |
|---|---|---|
| 1,531,098 | Holzach | Mar. 24, 1925 |
| 1,853,501 | Bormann | Apr. 12, 1932 |
| 2,045,090 | Lange | June 23, 1936 |
| 2,174,591 | Mendoza | Oct. 3, 1939 |
| 2,180,776 | Straub | Nov. 21, 1939 |
| 2,248,151 | Winkeler | July 8, 1941 |
| 2,314,023 | Straub | Mar. 16, 1943 |

FOREIGN PATENTS

| Number | Country | Date |
|---|---|---|
| 570,069 | Germany | Feb. 11, 1933 |
| 499,322 | Great Britain | Jan. 23, 1939 |
| 217,235 | Switzerland | Feb. 2, 1942 |